Nov. 27, 1934.  E. I. SPONABLE  1,982,599
METHOD AND APPARATUS FOR PRODUCING MOVING PICTURES
Filed March 29, 1927   2 Sheets—Sheet 1

Nov. 27, 1934.     E. I. SPONABLE     1,982,599
METHOD AND APPARATUS FOR PRODUCING MOVING PICTURES
Filed March 29, 1927     2 Sheets-Sheet 2

WITNESS
X. L. Meade

INVENTOR
By E. I. Sponable
Denison & Thompson
ATTORNEYS

Patented Nov. 27, 1934

1,982,599

UNITED STATES PATENT OFFICE

1,982,599

METHOD AND APPARATUS FOR PRODUCING MOVING PICTURES

Earl I. Sponable, New York, N. Y., assignor, by mesne assignments, to Movietonews, Inc., New York, N. Y., a corporation of New York Application March 29, 1927, Serial No. 179,214

4 Claims. (Cl. 88—16.2)

This invention relates to certain new and useful improvements in method and apparatus for the production of moving pictures and the simultaneous synchronized reproduction of a record corresponding to sound waves.

The main object of the invention resides in the production of moving pictures simultaneously with the reproduction of sound waves from a photographic record of light waves corresponding to sound waves, and in which the reproduced sound will actually issue from the picture.

Heretofore it has been customary and practically necessary to dispose the sound reproducing device or devices at one side of or above or below the screen upon which the moving picture is projected, with the result that the sound did not come directly from the picture, and I have discovered that by the use of a special screen in combination with the other portions of the apparatus, it is possible to produce a structure and carry out a method by which simultaneously with the production of the moving picture the sound waves corresponding to the picture are actually projected through the picture, whereby a more natural and effective result is produced.

I have produced an apparatus of this character, and have carried out the method successfully.

Figure 1:
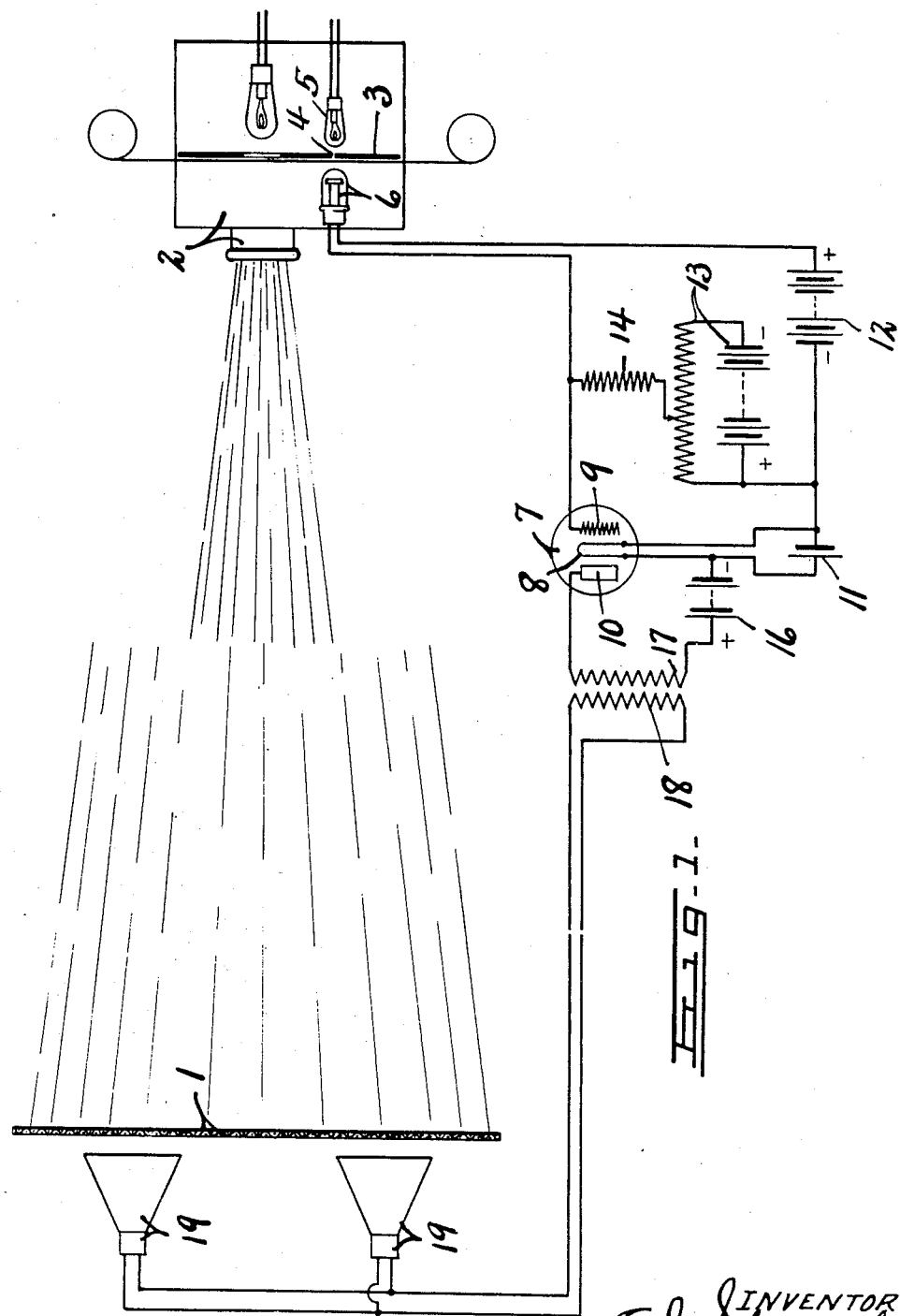

In the drawings, Figure 1 is a diagrammatic illustration of an embodiment of this invention.

Figure 2:
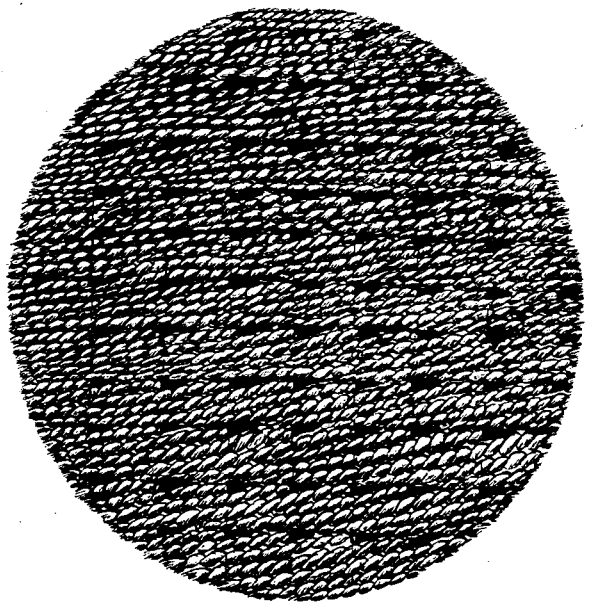
Figure 3:
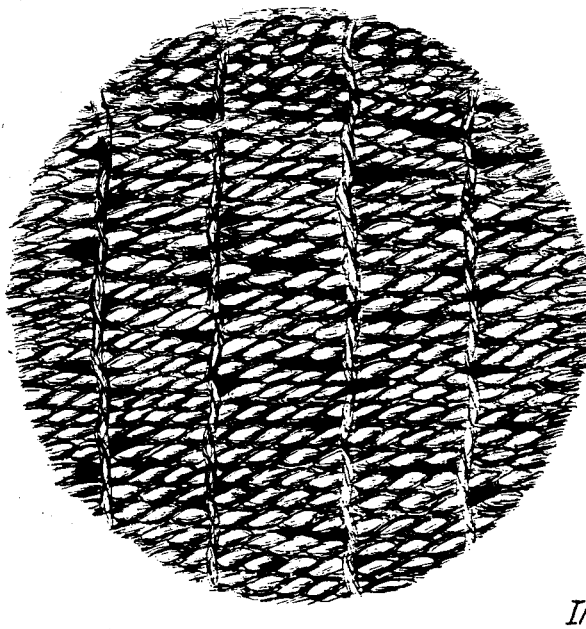

Figures 2 and 3 are photomicographs of a sample of baronet silk suitable for use as a screen material.

Referring to the drawings, the moving picture screen 1 must have a coefficient of reflection sufficient to produce a good picture and the screen must be of a character such that it will not permit the passage of light rays projected upon it. However, I have produced an apparatus including a screen having the required coefficient of reflection and the required imperviousness to light rays, which in addition is sufficiently porous to permit the substantially undamped passage of sound waves, whereby the sound producing devices can be disposed directly behind the screen, and the sound waves applicable to the picture actually projected through the picture without the absorption of any substantial amount of the sound.

The apparatus as shown comprises the screen 1 and a suitable moving picture projector 2 suitably positioned for projecting light rays constituting the picture upon the screen. In addition, there is provided a wall 3 having a narrow elongated slot 4 therein preferably corresponding substantially in area to the slot through which the sound picture was produced. The film is adapted to move past the slot 4, preferably in close relation with the slot, and light rays from a suitable source, indicates at 5, are projected through the slot upon the film, and pass through the sound record upon a light reactive resistance or a photo-electric cell illustrated at 6.

This photo-electric cell is connected in a circuit including any number of stages of amplification, a single stage being here illustrated, altho preferably a number of stages are used. This stage of amplification includes an electroionic device 7 of the three-electrode type, and including a filament 8, grid 9 and plate 10. A suitable means is provided for heating the filament, as for instance, a circuit including battery 11. The grid 9 and filament 8 are connected in circuit with the photo-electric cell 6, such circuit including a source of potentials, as battery 12. Preferably, a potentiometer 13 and a resistance 14 are connected in shunt with said circuit across the filament and the grid, whereby the desired potential may be maintained upon the grid for producing the most effective result.

The filament 8 and plate 10 are connected in circuit with a suitable source of potential, as battery 16, and in this case with the primary 17 of a transformer, the secondary 18 of which is connected in circuit with one or more translating devices 19 in the form of loud speakers disposed directly behind the screen 1, i. e. upon the opposite side of the screen from the projector 2.

Any member of translating devices 19 may be utilized and their form may be widely varied, and altho two are here illustrated, I have used four with satisfactory results.

Instead of the secondary 18 of the transformer, any suitable number of stages of amplification may be inserted at this point. The screen 1, as heretofore described, must be substantially impervious to light rays, and must have a co-efficient of reflection sufficient to reproduce a good picture and in addition, must have openings or pores of sufficient number and size to permit the passage of sound waves in substantially undamped condition.

These pores or openings may be disposed in the material which I have selected for the screen at varying inclinations to the surface thereof, or other conditions of structure may assist, not herein possible to describe, but I have found that the material known as baronet silk has all of the characteristics required for accomplishing the objects of this invention.

However, it may be that various other materials will be found having the same or substantially the same characteristics or perhaps improved characteristics, and for that reason I do not desire to restrict myself to any particular material, but only to the fact that the structure utilized shall include a screen having the necessary co-efficient of reflection, the necessary imperviousness to light in combination with the additional feature that the screen permits the passage of sound waves in substantially undamped condition.

I claim:

1. An apparatus for reproducing combined moving and sound pictures comprising a screen of porous fabric impervious to light rays but allowing sound waves to pass through unimpeded, a projecting apparatus for projecting light rays constituting the moving picture upon the screen, a translating device disposed upon the side of the screen opposite the projecting apparatus, and means for energizing the translating apparatus to produce sound waves which are projected through said screen.

2. An apparatus for reproducing combined moving and sound pictures comprising a screen of porous fabric impervious to light rays but allowing sound waves to pass through unimpeded, a projecting apparatus for projecting light rays constituting the moving picture upon the screen, a translating device disposed behind the screen on the side opposite the projecting apparatus, a circuit connected to the translating device, a light reactive device in said circuit, and means for causing light rays varied in accordance with sound waves to strike said light reactive device.

3. An apparatus for reproducing combined moving and sound pictures comprising a screen of loosely woven fabric impervious to light rays but allowing sound to pass through unimpeded and undistorted, a projecting apparatus for projecting light rays constituting the moving picture upon the screen, a translating device disposed upon the side of the screen opposite the projecting apparatus, and means for energizing the translating apparatus to produce sound waves which are projected through said screen.

4. An apparatus for reproducing combined moving and sound pictures comprising a screen consisting of a single thickness of woven textile fabric having openings extending from front to rear of the screen sufficient in number and size to allow sound waves to pass through substantially unimpeded and undistorted but substantially impervious to light rays and retaining the light reflecting properties sufficiently to constitute an efficient screen, a projecting apparatus for projecting light rays constituting the moving picture upon the front reflecting surface of said screen, a translating device disposed upon the side of the screen opposite the projecting apparatus, and means for energizing the translating apparatus to produce sound waves which are projected through said screen and through the reflected image projected thereon.

EARL I. SPONABLE.